United States Patent
Ovadia

(10) Patent No.: US 9,939,823 B2
(45) Date of Patent: Apr. 10, 2018

(54) HOME AUTOMATION CONTROL SYSTEM

(71) Applicant: Wise Spaces Ltd., Hod Hasharon (IL)

(72) Inventor: Yehuda Ovadia, Hod Hasharon (IL)

(73) Assignee: Wise Spaces Ltd., Hod Hasharon (IL)

( * ) Notice: Subject to any disclaimer, the term of this patent is extended or adjusted under 35 U.S.C. 154(b) by 262 days.

(21) Appl. No.: 14/296,561

(22) Filed: Jun. 5, 2014

(65) Prior Publication Data

US 2015/0355649 A1 Dec. 10, 2015

(51) Int. Cl.

| | |
|---|---|
| G05B 11/01 | (2006.01) |
| G05D 23/19 | (2006.01) |
| G10L 17/22 | (2013.01) |
| G10L 15/20 | (2006.01) |
| G05B 15/02 | (2006.01) |
| G08B 19/00 | (2006.01) |
| G08B 25/14 | (2006.01) |
| G08B 21/04 | (2006.01) |

(52) U.S. Cl.
CPC ......... *G05D 23/1917* (2013.01); *G05B 15/02* (2013.01); *G08B 19/00* (2013.01); *G08B 25/14* (2013.01); *G10L 15/20* (2013.01); *G10L 17/22* (2013.01); *G05B 2219/25011* (2013.01); *G08B 21/0438* (2013.01)

(58) Field of Classification Search
CPC .................................................. G08B 21/0438
USPC .......................................................... 700/19
See application file for complete search history.

(56) References Cited

U.S. PATENT DOCUMENTS

| | | | | |
|---|---|---|---|---|
| 4,857,912 A | * | 8/1989 | Everett, Jr. ............ | G08B 19/00 340/508 |
| 5,801,940 A | * | 9/1998 | Russ ...................... | G01D 4/004 700/276 |
| 6,208,905 B1 | * | 3/2001 | Giddings ............... | G08B 19/00 340/501 |

(Continued)

FOREIGN PATENT DOCUMENTS

| | | |
|---|---|---|
| DE | 20021902 | 6/2001 |
| EP | 1154406 B1 | 4/2007 |

(Continued)

OTHER PUBLICATIONS

European Search Report for corresponding EP application EP15170478 dated Oct. 23, 2015.

(Continued)

*Primary Examiner* — Forrest F Tzeng
(74) *Attorney, Agent, or Firm* — Heidi Brun Associates Ltd.

(57) ABSTRACT

A smart premises controller unit for processing data received from a plurality of sensors and for controlling and monitoring one or more pieces of equipment in at least one room in a premises responsive to the processing includes an alarm resolver to activate an alarm, a climate resolver to control a climate in the room and a presence resolver to determine at least the presence of a human in the room. Each resolver receives input from a subset of the plurality of sensors and each the resolver comprises a sensor processor and scorer for at least one of its associated subset of sensors. Each resolver comprises a set of models for each of its associated sensors according to its type of resolver. Each sensor processor and scorer matches its sensor data against its models to produce a score for each of its associated models.

31 Claims, 11 Drawing Sheets

(56) References Cited

U.S. PATENT DOCUMENTS

| | | | |
|---|---|---|---|
| 6,756,998 B1 * | 6/2004 | Bilger | H04L 12/2803 715/734 |
| 6,865,428 B2 | 3/2005 | Gonzales et al. | |
| 6,909,921 B1 * | 6/2005 | Bilger | G05B 15/02 700/14 |
| 6,912,429 B1 * | 6/2005 | Bilger | G08B 25/008 236/49.3 |
| 7,693,670 B2 | 4/2010 | Durling et al. | |
| 2003/0187659 A1 | 10/2003 | Cho et al. | |
| 2006/0287735 A1 | 12/2006 | Garcia | |
| 2007/0024451 A1 * | 2/2007 | Albert | G08B 17/00 340/573.1 |
| 2009/0062940 A1 | 3/2009 | Bennett | |
| 2009/0149973 A1 | 6/2009 | Keller et al. | |
| 2012/0310415 A1 | 12/2012 | Raestik et al. | |

FOREIGN PATENT DOCUMENTS

| | | |
|---|---|---|
| EP | 1892593 | 2/2008 |
| EP | 2431955 | 3/2012 |
| WO | 199960804 | 11/1999 |
| WO | 2004077308 | 9/2004 |
| WO | 2012037434 | 3/2012 |
| WO | 2013028941 | 2/2013 |
| WO | 2013111134 | 8/2013 |

OTHER PUBLICATIONS

*Fuzzy Sets and Fuzzy Logic: Theory and Applications*, by George J, Kir and Bo Yuan, Prentice Hall PTR, 1995, (ISBN 0131011715), Table pf Contents.
English Machine Translation of EP1892593 generated at the EPO website on Aug. 5, 2014.

\* cited by examiner

HOME AUTOMATION CONTROL SYSTEM

FIELD OF THE INVENTION

The present invention relates to home, office and building automation systems generally and to a self-learning home, office and building automation control system in particular.

BACKGROUND OF THE INVENTION

Home automation generally refers to the automation of the home and of activities associated with the home. It may include automatic control of lighting and blinds, HVAC (heating, ventilation and air conditioning), electrical appliances and electronic devices, security systems including alarms and door locks, health care, sprinkler system, pet feeding, houseplants, pool systems, among other systems which may be found in a home. The control may be at the level of simple remote control of appliances to complex computer/micro-controller based networks with varying degrees of intelligence and automation.

Some of these home activities may be simple activities such as turning on a light in a room at the same time every day, while others may be much more complex such as sensing the presence of a person in a room and adjusting lighting, temperature and music volume in the room taking into consideration factors such as the day of the week and the time of day. Home automation systems may additionally provide increased quality of life for elderly and disabled persons who might otherwise require caregivers for assistance in carrying out home activities, or in some cases even require institutional care.

The elements of a home automation system may include sensors, such as temperature sensors, light sensors, humidity sensors, $CO_2$ sensors, motion detectors, smoke detectors and others; actuators which may include electronic valves, switches, relays, and motors; and a controller which may be a centralized controller and/or multiple intelligent devices installed around the home.

The controller(s) may be preprogrammed to control the actuators responsive to information received from the sensors, or may learn to control the actuators by associating real-time human interactions with the system with information received from the sensors. One or more human-machine interface devices may be required so that the residents of the home may interact with the system for monitoring and control. The interface devices may include a specialized terminal, or may be a computerized device having display capabilities such as a personal computer or a laptop computer, or may include an application running on a smart phone or tablet computer. Communication between the different elements of the home automation system may be over dedicated wiring, a wired network, a wireless network, or a combination of any of the former.

A home automation system including multiple intelligent devices distributed around the home is described in U.S. Pat. No. 6,865,428 B2, "METHOD AND APPARATUS FOR PROVIDING DISTRIBUTED CONTROL OF A HOME AUTOMATION SYSTEM" to Gonzales et al. Described therein is "a method and apparatus for providing distributed control of a home automation system is provided. Each device participating in a home automation system is equipped with control logic for providing distributed control. Through the control logic, each device maintains scene definitions describing the state of the device for each scene in which it participates. When any device in the system receives a request to launch a scene, such as a button press on one of the devices, the device broadcasts a scene state change message to all devices within the home automation system. The scene state change message identifies to each device a particular scene that should be launched. Each device in the system receives the message and determines whether the device is a participant in the scene. If the device is a participant in the scene, the device adjusts its state according to a scene definition stored in the device associated with the scene. The device may adjust a controlled electrical load, such as a light, according to the scene definition by turning the load on, off, or setting the load to some intermediate value".

Home automation systems may be self-learning and may include a controller which, based on environmental changes may autonomously make decisions regarding monitoring and controlling conditions in one or more rooms within a home. Such a home automation system is described in U.S. Patent Application Publication No. US 2012/0310415 A1, "CONTROL PANEL FOR CONTROL SYSTEM AND A CONTROL SYSTEM", to Raestik et al. Described therein is "a control panel and controlling system for adjusting environmental conditions of at least one location, wherein the location has desired environmental conditions. The system comprises equipments controlled by controlling means for changing and/or maintaining the environmental condition of the locations. The controlling means is adapted to provide controlling parameters to equipments for adjusting the environmental condition of said location. The system includes a control panel including at least one sensor, whereby the environmental condition is controlled on the basis of the signal received from the sensor".

SUMMARY OF THE PRESENT INVENTION

There is provided, in accordance with a preferred embodiment of the present invention, a smart premises controller unit for processing data received from a plurality of sensors and controlling and monitoring one or more pieces of equipment in at least one room in a premises responsive to the processing. The controller unit includes at least two of the following resolvers: an alarm resolver to activate an alarm, a climate resolver to control a climate in the room and a presence resolver to determine at least the presence of a human in the room. Each resolver receives input from a subset of the plurality of sensors and each resolver includes a sensor processor and scorer for at least one of its associated subset of sensors. Each resolver includes a set of models for each of its associated sensors according to its type of resolver and each sensor processor and scorer matches its sensor data against its models to produce a score for each of its associated models.

Moreover, in accordance with a preferred embodiment of the present invention, the plurality of sensors includes two or more of the following: a movement sensor for detecting movement of a mammal in the at least one room, an acoustic sensor for sensing sound in the at least one room, a thermometer for sensing an ambient temperature in the at least one room, a light sensor for sensing a level of illumination in the at least one room, a humidity sensor for sensing a humidity level in the at least one room, a $CO_2$ sensor for sensing a $CO_2$ level in the at least one room and an image sensor for imaging the at least one room.

Further, in accordance with a preferred embodiment of the present invention, the one or more pieces of equipment include any one of an alarm system, appliances and electrical devices, an entertainment system, and a HVAC elements.

Still further, in accordance with a preferred embodiment of the present invention, the subset of sensors for the alarm resolver may include at least two of the following: the movement sensor, the acoustic sensor, the light sensor, the $CO_2$ sensor, and the image sensor. The subset of sensors for the presence resolver may include at least two of the following: the movement sensor, the acoustic sensor, the light sensor, the $CO_2$ sensor, and the image sensor. The subset of sensors for the climate resolver may include at least two of the following: the thermometer, the humidity sensor and the $CO_2$ sensor.

Further, in accordance with a preferred embodiment of the present invention, each resolver includes a multifunctional processor to combine at least the scores from different disciplines producing an overall score.

Moreover, in accordance with a preferred embodiment of the present invention, at least one of the plurality of sensors is an acoustic sensor, wherein the presence resolver and the alarm resolver receive the output of the acoustic sensor. The unit also includes a voice resolver for generating a voice instruction responsive to signaling from the acoustic sensor.

Still further, in accordance with a preferred embodiment of the present invention, at least one of the resolvers includes a cognitive unit to learn from at least its sensor data and to modify parameters of operation of the resolver.

Additionally, in accordance with a preferred embodiment of the present invention, the unit also includes an event resolver to change the state at least one of the pieces of equipment. The event resolver includes a learning module to learn from events produced by at least one of: the presence resolver, the alarm resolver, the climate resolver, voice resolver for generating a voice instruction and input from a user.

Further, in accordance with a preferred embodiment of the present invention, the unit also includes a cognitive unit to analyze the statistics of the learning module and to generate therefrom at least one of scenario and/or automation updates for automatic operation of the equipment.

Still further, in accordance with a preferred embodiment of the present invention, the unit also includes a proactive module to analyze the statistics of the learning module and to generate therefrom at least one new change of state of at least one of the pieces of equipment or at least one new scenario for the equipment.

Moreover, in accordance with a preferred embodiment of the present invention, at least two of the plurality of sensors is integrally formed with the unit.

There is also provided, in accordance with a preferred embodiment of the present invention, an automation unit to form, with at least another automation unit, a distributed control system. Each automation unit includes a controller, a communication module and a database. The controller controls at least one of the pieces of equipment and/or to control the equipment according to a schedule. The communication module communicates with other units in a single premises and the database stores a local database and at least one shared database from another of the at least one other units.

Furthermore, in accordance with a preferred embodiment of the present invention, the unit also includes a recovery unit to take over the operation of a non-functioning portion of one of the units using data in the shared database associated with the non-functioning portion.

There is further provided, in accordance with a preferred embodiment of the present invention, an automation unit for controlling pieces of equipment in a room. The unit includes a touch screen display, a database of events and a proactive unit. The touch screen display receives input from a user of the unit and has a default screen to display categories of elements related to the pieces of equipment to be controlled. The database stores events for the pieces of equipment and the proactive unit reviews the events to determine the most frequently used ones of the pieces of equipment of different application categories and to indicate to the touch screen display to display the frequently used ones of the pieces of equipment on the default screen.

There is also provided, in accordance with a preferred embodiment of the present invention, a cognitive automation unit. The cognitive automation unit includes at least two of the following resolvers: an alarm resolver to activate an alarm, a climate resolver to control a climate in the room, a presence resolver to determine the presence of a human in the room, a voice resolver to generate a voice instruction and an event resolver to control at least one of the pieces of equipment from events produced by at least one of: the presence resolver, the alarm resolver, the climate resolver, the voice resolver and input from a user. Each of the alarm, voice, climate and presence resolver receives input from a subset of the plurality of sensors. At least one resolver includes a resolver analyzer to learn from output of its subset of sensors and/or processing of its resolver and/or events produced thereby and to modify parameters of operation of the resolver.

Moreover, in accordance with a preferred embodiment of the present invention, the event resolver is part of a cognitive cycle that also includes an updater module to analyze the statistics of events and to generate therefrom at least one of scenario or automation updates for automatic control of the equipment.

Further, in accordance with a preferred embodiment of the present invention, the event resolver also includes a proactive module to analyze the statistics of the events and to generate therefrom at least one new change of state of at least one of the pieces of equipment or at least one new scenario for the equipment.

There is also provided, in accordance with a preferred embodiment of the present invention, a proactive automation unit which includes at least one of the following resolvers: an alarm resolver to activate an alarm, a climate resolver to control a climate in the room, a presence resolver to determine the presence of a human in the room, and a voice resolver to generate a voice instruction. Each of the alarm, climate and presence resolver receives input from a subset of the plurality of sensors. The unit also includes an event resolver to control the pieces of equipment at least in response to the events. The event resolver includes a proactive module to generate at least one new change of state of at least one piece of equipment or a scenario based on event data from the resolvers.

There is also provided, in accordance with a preferred embodiment of the present invention, an energy controller which includes a presence resolver to determine the presence of a human in the room and a climate resolver to maintain a climate in the room as defined by a user of the room with minimal energy expenditure and in response to output of the presence resolver. Each resolver receives input from a subset of the plurality of sensors and each resolver includes a sensor processor and scorer for at least one of its associated subset of sensors. Each resolver includes a set of models for each of its associated sensors according to its type of resolver and each sensor processor and scorer matches its received sensor data against its models to produce a score for each of its associated models. Each resolver includes a multifunctional processor to combine at least the scores from different disciplines into an overall score. The unit also includes an event resolver to control energy consuming pieces of equipment in response to output of the climate and presence resolvers. The energy controller may use the cognitive cycle and may use a proactive module to generate new changes of state and/or new scenarios.

There is also provided, in accordance with a preferred embodiment of the present invention, a voice resolver unit to process audio data. The unit includes a noise detection and cancellation module operative on the audio data, a voice recognition engine to recognize voice in the output of the noise detection and cancellation module, a noise model scorer to match received audio data against at least two noise models to determine the type or types of noise in the audio data, and a recognition analyzer to analyze the quality of the output of the recognition engine as a function of the operation of the noise detection and cancellation module according to the type or types of noise detected.

There is also provided, in accordance with a preferred embodiment of the present invention, an automation unit for a premises. The automation unit includes at least two sensors, of which one is an acoustic sensor to sense sound in the room and a presence resolver to determine if a person is in the room. The presence resolver includes a multifunctional processor to determine the presence from the output of the at least two sensors.

There is also provided, in accordance with a preferred embodiment of the present invention, an alarm system protecting a predefined space. The alarm system includes at least an acoustic sensor to sense sound in the space, a movement sensor to detect movement in the space and an alarm resolver to determine if a person is in the room, the alarm resolver including a multifunctional processor to determine if a room has been invalidly entered from the output of at least the sensors and to activate an alarm when the determination is positive.

There is also provided, in accordance with a preferred embodiment of the present invention, a method for processing data received from a plurality of sensors and controlling and monitoring one or more pieces of equipment in at least one room in a premises responsive to the processing. The method includes at least two of the following steps: resolving whether to activate an alarm, resolving a climate in the room, and resolving at least the presence of a human in the room. Each resolving includes matching sensor data from its associated subset of the plurality of sensors against its separate set of models for each of its associated sensors to produce a score for each of its associated models. Each resolving includes receiving input from a subset of the plurality of sensors.

Moreover, in accordance with a preferred embodiment of the present invention, each resolving includes combining at least the scores from different disciplines producing an overall score.

Additionally, the method includes generating a voice instruction responsive to signaling from an acoustic sensor.

Further, in accordance with a preferred embodiment of the present invention, at least one of the resolving includes learning from at least its associated sensor data and modifying parameters of operation.

Still further, in accordance with a preferred embodiment of the present invention, the method also includes changing the state of at least one of the pieces of equipment wherein the changing includes learning from events produced by at least one of the resolving, generating a voice instruction and input from a user.

Moreover, in accordance with a preferred embodiment of the present invention, the method also includes analyzing the statistics of the learning and generating therefrom at least one of scenario and/or automation updates for automatic operation of the equipment.

Further, in accordance with a preferred embodiment of the present invention, the method also includes analyzing the statistics of the learning and proactively generating therefrom at least one new change of state of at least one of the pieces of equipment or at least one new scenario for the equipment.

There is also provided, in accordance with a preferred embodiment of the present invention, a distributed method for controlling and monitoring one or more pieces of equipment in at least one room in a premises. The method includes controlling at least one of the pieces of equipment and/or controlling the equipment according to a schedule, communicating with at least one other units in a single premises and storing a local database and at least one shared database from another of the at least one other units.

Further, in accordance with a preferred embodiment of the present invention, the method also includes taking over the operation of a non-functioning portion of one of the units using data in the shared database associated with the non-functioning portion.

There is also provided, in accordance with a preferred embodiment of the present invention, a method for controlling pieces of equipment in a room. The method includes having a touch screen display, the touch screen display having a default screen to display categories of elements related to the pieces of equipment to be controlled, receiving input from a user via the touch screen, storing events for the pieces of equipment, proactively reviewing events to determine the most frequently used ones of the pieces of equipment of different application categories, and indicating to the touch screen display to display the frequently used ones of the pieces of equipment on the default screen.

There is also provided, in accordance with a preferred embodiment of the present invention, a cognitive method. The method includes at least two of the following resolving and controlling steps: resolving whether to activate an alarm, resolving a climate in the room, resolving the presence of a human in the room, resolving a voice instruction and controlling at least one of the pieces of equipment according to events produced by at least one of the resolving and input from a user. Each resolving includes receiving input from a subset of the plurality of sensors, and at least one of the resolving and controlling includes learning from output of its associated subset of sensors and/or its processing and/or events produced thereby and modifying parameters of operation of the resolver.

Further, in accordance with a preferred embodiment of the present invention, the method also includes analyzing the statistics of events and generating therefrom at least one of scenario or automation updates for automatic control of the equipment.

Still further, in accordance with a preferred embodiment of the present invention, the method also includes proactively analyzing the statistics of the events and generating therefrom at least one new change of state of at least one of the pieces of equipment or at least one new scenario for the equipment.

There is further provided, in accordance with a preferred embodiment of the present invention, a proactive method which includes at least one of the following steps of resolving: resolving whether to activate an alarm, resolving a climate in the room, resolving the presence of a human in the room and resolving a voice instruction. Each resolving includes receiving input from a subset of the plurality of sensors. The method also includes resolving the control of the pieces of equipment at least in response to events and proactively generating at least one new change of state of at least one piece of equipment and/or a scenario based on event data from the resolving.

There is also provided, in accordance with a preferred embodiment of the present invention, a method for controlling energy use. The method includes resolving the presence of a human in the room and resolving a climate in the room as defined by a user of the room with minimal energy expenditure and in response to output of the presence resolving. Each resolving includes matching sensor data from its associated subset of the plurality of sensors against its separate set of models for each of its associated sensors to produce a score for each of its associated models and combining at least the scores from different disciplines into an overall score. Each resolving includes receiving input from a subset of the plurality of sensors.

Moreover, in accordance with a preferred embodiment of the present invention, at least one of the resolving includes learning from at least its sensor data and modifying parameters of operation. The method may also include proactively generating new change of state and/or new scenarios.

There is further provided, in accordance with a preferred embodiment of the present invention, a method to process audio data. The method includes detecting and cancelling noise in the audio data, recognizing voice in the audio data after the detecting and cancelling, matching received audio data against at least two noise models to determine the type or types of noise in the audio data, and analyzing the quality of the output of the recognized voice as a function of the operation of the detecting and cancelling according to the type or types of noise detected.

There is also provided, in accordance with a preferred embodiment of the present invention, a method for determining if a person is in a room. The method includes sensing a room with at least two sensors, of which one is an acoustic sensor, and determining if the person is in the room at least from the output of the sensing.

Finally, there is provided, in accordance with a preferred embodiment of the present invention, a method for protecting a predefined space. The method includes sensing sound in the space, detecting movement in the space, determining if the space has been invalidly entered at least from the output of the sensing and detecting, and when the method is activated, activating an alarm if the determining is positive.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
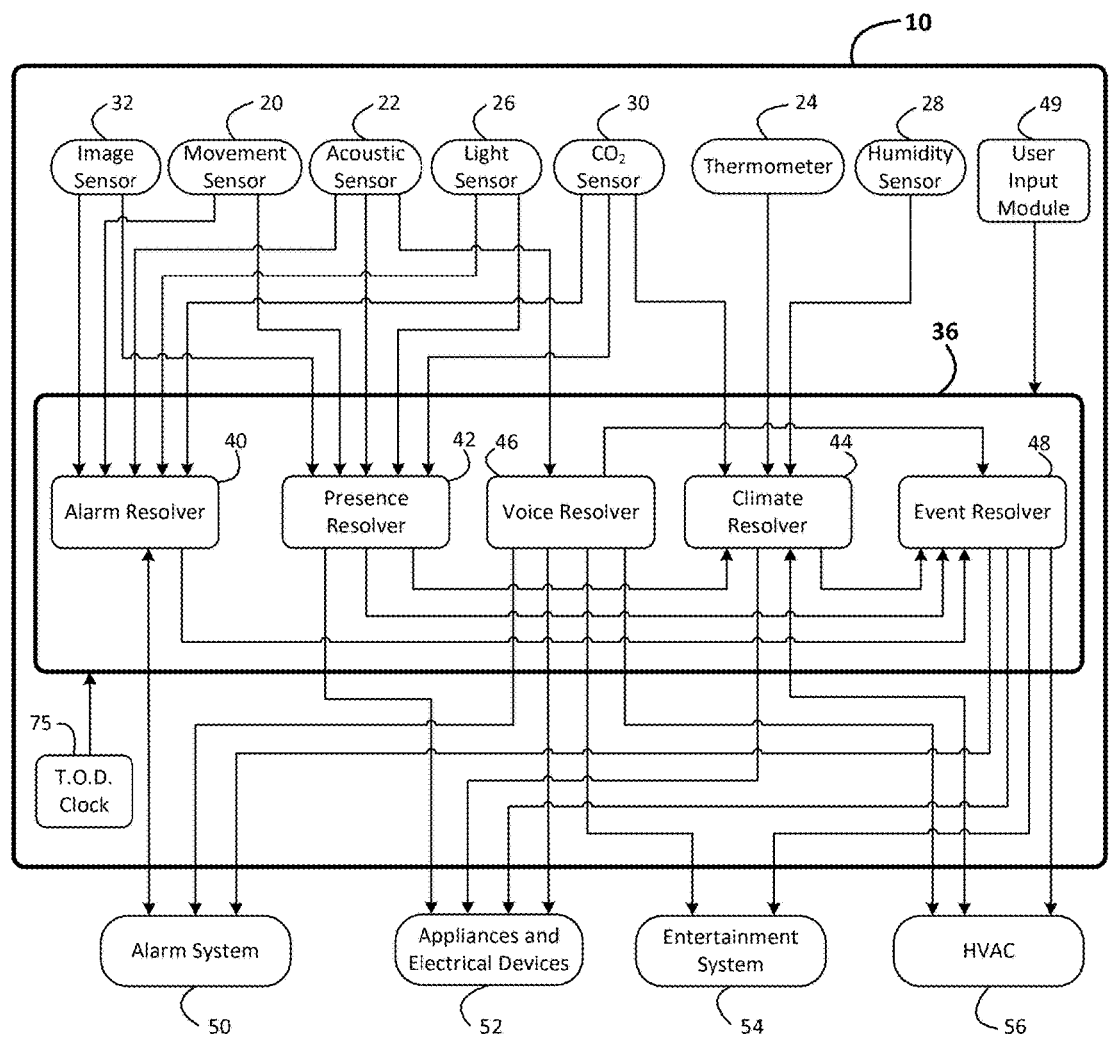
FIG. 1 is a schematic illustration of an automation unit, constructed and operative in accordance with a preferred embodiment of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Applicant has realized that the many building automation systems do not handle the entirety of activities which occur within a room or a given space. Many automation systems handle environmental activities (like climate and lighting) while others handle security, yet none of them handle the entire range of activities that a person may want to do within a room of a house or a building.

Moreover, Applicant has realized that, with only a few sensors and a few resolvers, the entire range of activities of a room may be handled, where the activities may include changes to the climate and/or lighting of the room, and/or activation of entertainment systems (stereo, TV, computer, games, etc.) and/or other appliances (coffee machine, refrigerator, etc.), and/or detecting of an intrusion.

Applicant has further realized that the quality of detection for many of the activities of a room may be improved if at least one of the sensors is an acoustic sensor or an image sensor. For example, both types of sensors may provide differentiation between types of mammals in a room (humans vs. pets) and may improve intrusion detection.

Still further, Applicant has realized that home automation systems may carry out relatively complex home activities if, instead of a controller directly associating a sensor with one or more particular actuators, the controller processes the data received from a plurality of different sensors and responsively operates one or more actuators which may or may not be directly associated with the sensors.

Reference is now made to FIG. 1, which illustrates a room automation unit 10 which may handle the range of activities of the room. Unit 10 may comprise a plurality of sensors 20-32, a smart home or premises controller 36 and may operate equipment 50-56. Smart home controller 36 may comprise a multiplicity of resolvers 40-48, each of which may resolve input from a subset of said plurality of sensors 20-32 and, as a result of the processing, may provide instructions to equipment 50-56, via a wired or wireless connection. In addition, smart home controller 36 may comprise a user input module 49 and a clock module 75, such as a time of day clock or an astronomic clock.

In accordance with a first preferred embodiment of the present invention, the elements of unit 10 may be housed together in a single unit, with sensors 20-32 arranged on the outer surface of the unit or inside of it, thereby to sense the room. In an alternative embodiment, some or all of sensors 20-32 may be external sensors, communicating via a wired or wireless connection.

Sensors 20-32 may comprise a movement detector 20, an acoustic sensor 22, a thermometer 24, a light sensor 26, a humidity sensor 28, a $CO_2$ sensor 30 and an image sensor 32. While it is believed that this is a sufficient list of sensors, it is possible that the present invention may be implemented with fewer or more sensors.

Equipment 50-56 may comprise an alarm system 50, appliances and electrical devices 52, entertainment equipment 54 and HVAC elements 56. Alarm system 50 may be any suitable alarm system, such as an alarm device that gives an audible, visual or other form of alarm signal about a problem or condition and which is equipped with a communication module. Appliances and electrical devices 52 may be any suitable devices which may or may not be in the room and/or may affect the room, such as window blinds, curtains, lights, coffee machines, refrigerators, etc. Entertainment system 54 may be any entertainment device, such as a radio, a computing device, a home entertainment system, a projector, a mobile device, an electronic game device, etc. HVAC elements 56 may be any climate control device, such as an air conditioner, heater, humidifier, cooler, etc.

Smart home controller 36 may comprise an alarm resolver 40, a presence resolver 42, a climate resolver 44, a voice resolver 46 and an event resolver 48.

Alarm resolver 40 may receive input indicating a break-in and/or the presence of a person in the room, which person is either a stranger or is in the room at an abnormal time. For this purpose, alarm resolver 40 may receive input from movement detector 20, from acoustic sensor 22 (such as for detection of a loud noise caused by the intrusion and for the sounds of a stranger in the room), from light sensor 26, from $CO_2$ sensor 30 and from image sensor 32. Each of these sensors may be utilized to provide a different aspect of the intrusion or intruder to alarm resolver 40. When an intrusion is determined, alarm resolver 40 may indicate to alarm system 50 to activate an alarm, and may also indicate to event resolver 48 to actuate other equipment in the building.

Presence resolver 42 may determine the presence of a human and/or a pet in the room and, in accordance with a preferred embodiment of the present invention, may receive input from movement detector 20, acoustic sensor 22, light sensor 26, $CO_2$ sensor 30 and image sensor 32. While any of these sensors may be utilized by itself to indicate the presence of a body in the room, their combination, wholly or in part, may raise the possibility that the indication will be accurate, since each sensor, on its own, has its own sources of error. A movement detector may detect all movement, including that of a small mammal running across the floor. A $CO_2$ sensor may similarly provide inaccurate information. Yet their combination, together with acoustic sensor 22 (which may be processed for human sounds) and/or image sensor 32 (whose output may be processed to find a human shape) may greatly increase the accuracy of the presence detection.

Presence resolver 42 may store therein instructions of which appliances and electrical devices 52 to activate or to change their state upon detecting the presence of a human in the room. Presence resolver 42 may also provide its instructions and events, or lack thereof, to event resolver 48 and to climate resolver 44 so that they may incorporate presence information into their decision processes.

Climate resolver 44 may determine the current climate of the room and may provide instructions to appliances and electrical devices 52 and/or to HVAC 56 to change the climate to that requested by the user. To this end, climate resolver 44 may receive sensed input from thermometer 24, humidity sensor 28 and $CO_2$ sensor 30 and presence information from the presence resolver 42. Once again, the input from multiple types of sensors may provide a more accurate picture of the climate allowing finer control of the climate of the room, either by actuating the HVAC 56 elements and/or by instructing other appliances and electrical devices 52, such as window blinds or other climate affecting actuators.

Climate resolver 44 may also include the presence information from presence resolver 42 to determine the climate to be achieved. For example, climate resolver 44 may attempt to achieve a more desired climate only when presence resolver 42 may indicate the presence of a human in the room. Climate resolver 44 may also provide its instructions and events to event resolver 48.

Voice resolver 46 may include a voice recognition engine and may receive input from acoustic sensor 22. Voice resolver 46 may, after recognizing the spoken words, provide instructions to any of appliances and electrical devices 52, entertainment devices 54, alarm system 50, HVAC elements 56 and/or others. Voice resolver 46 may also provide its instructions and events to event resolver 48.

Event resolver 48 may receive instructions from the user via user input module 49, which may operate with any type of an input element or input interface, such as a touch screen display, a keyboard, a remote controller, a mobile device or other, which may define when and/or under what conditions the various equipment 50-56 are to be operated. Event resolver 48 may receive instructions through user input module 49 or may receive instructions from resolvers 40-46. Event resolver 48 may then operate the appropriate equipment, with or without a schedule. One such activation may be to arm alarm resolver 40 to look for intrusions.

As can be seen, each sensor may provide input to more than one resolver and each resolver may receive input from more than one sensor. Thus, with a relatively small set of sensors, the present invention may be able to carry out relatively complex home activities.

Figure 2A:
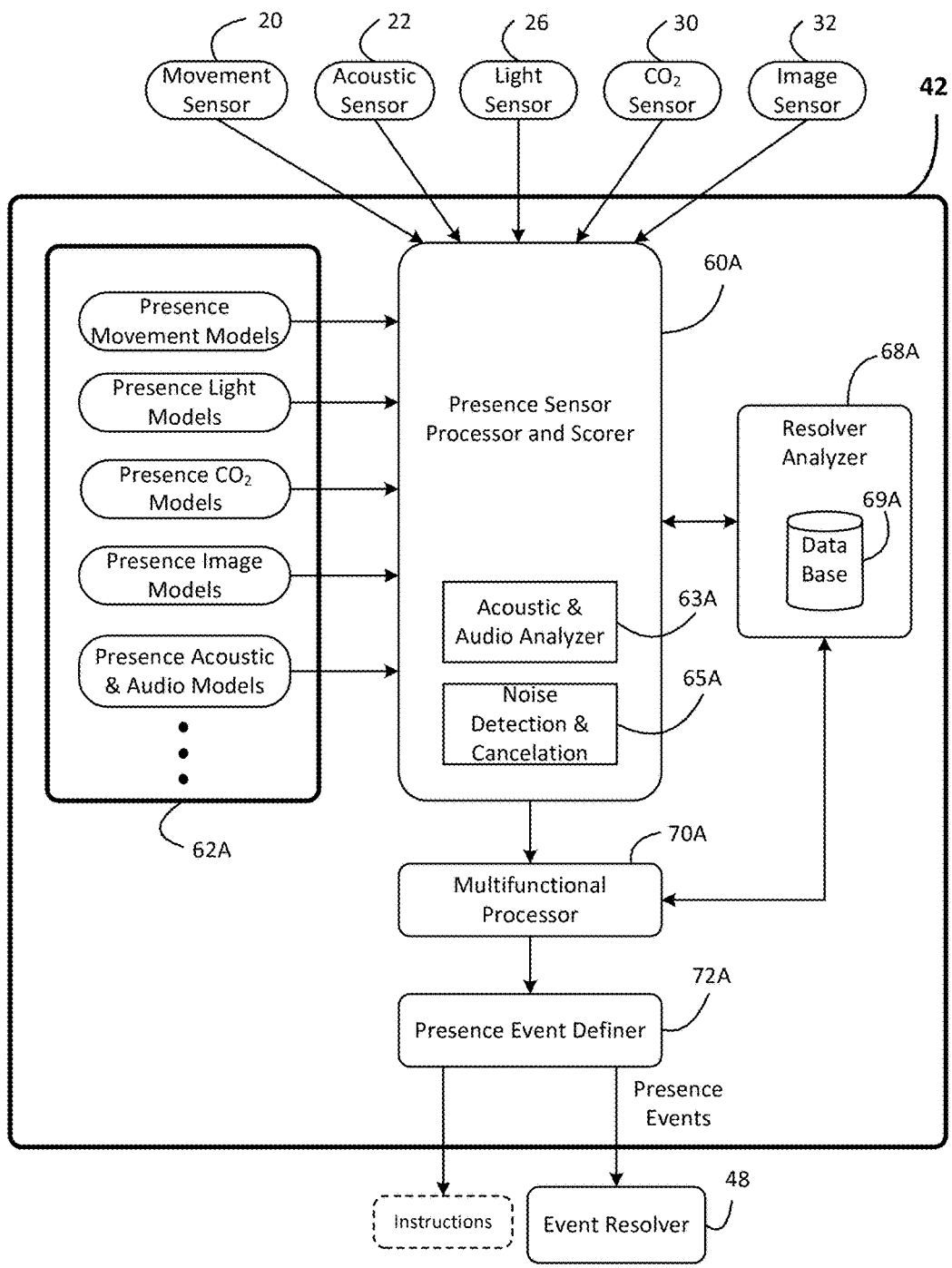
FIGS. 2A, 2B, 2C and 2D are schematic illustrations of resolvers forming part of the automation unit of FIG. 1.
Figure 2B:
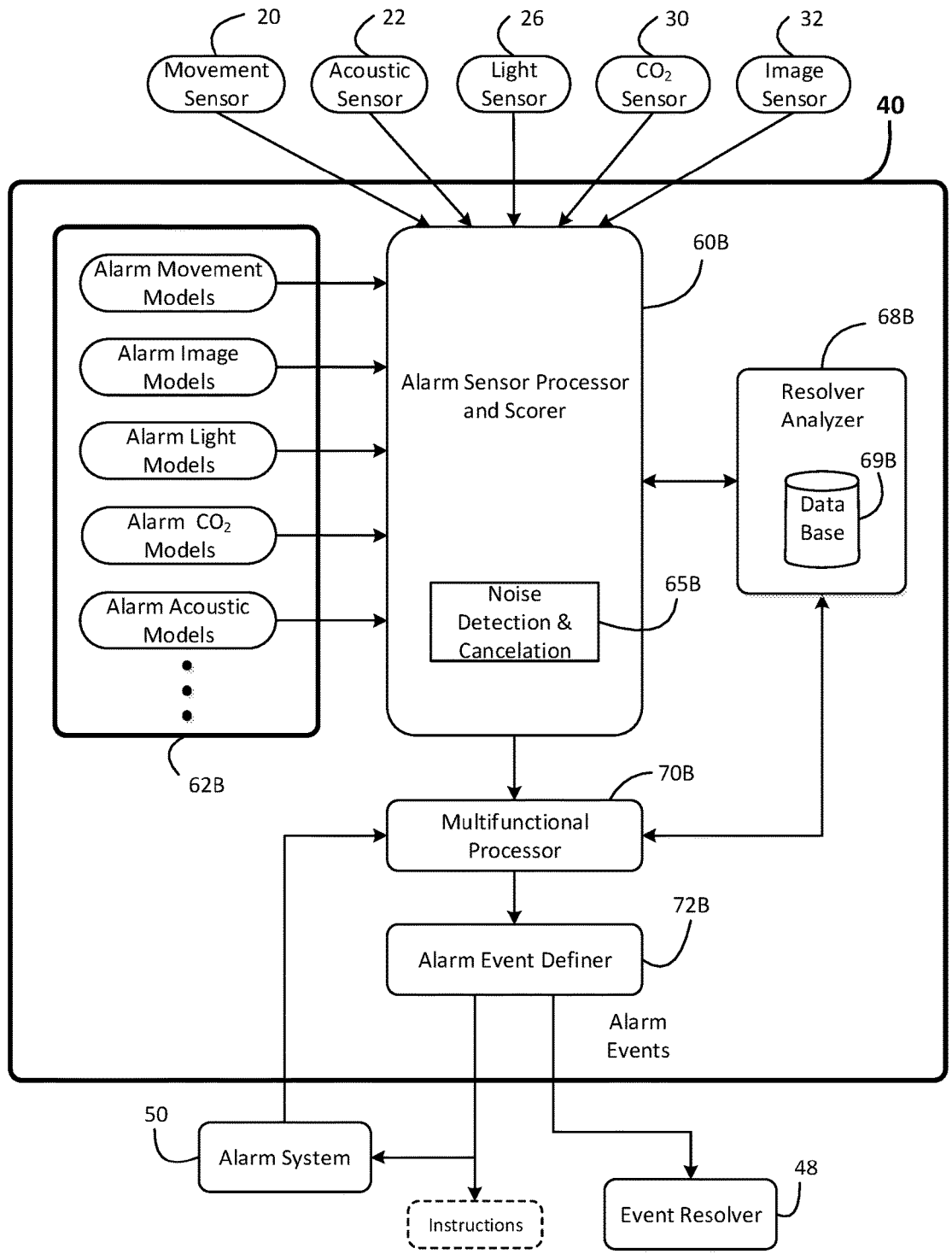
Figure 2C:
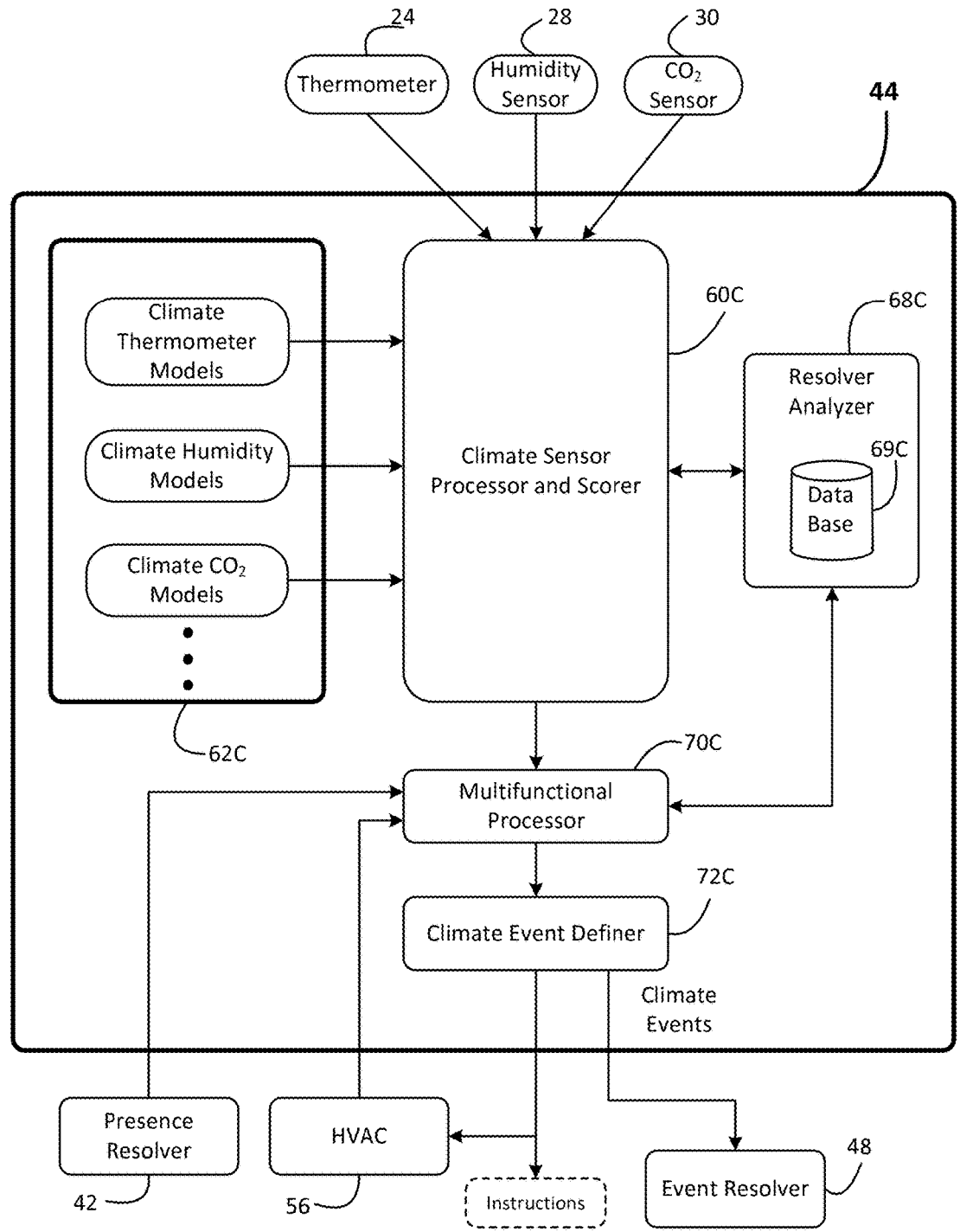
Figure 2D:
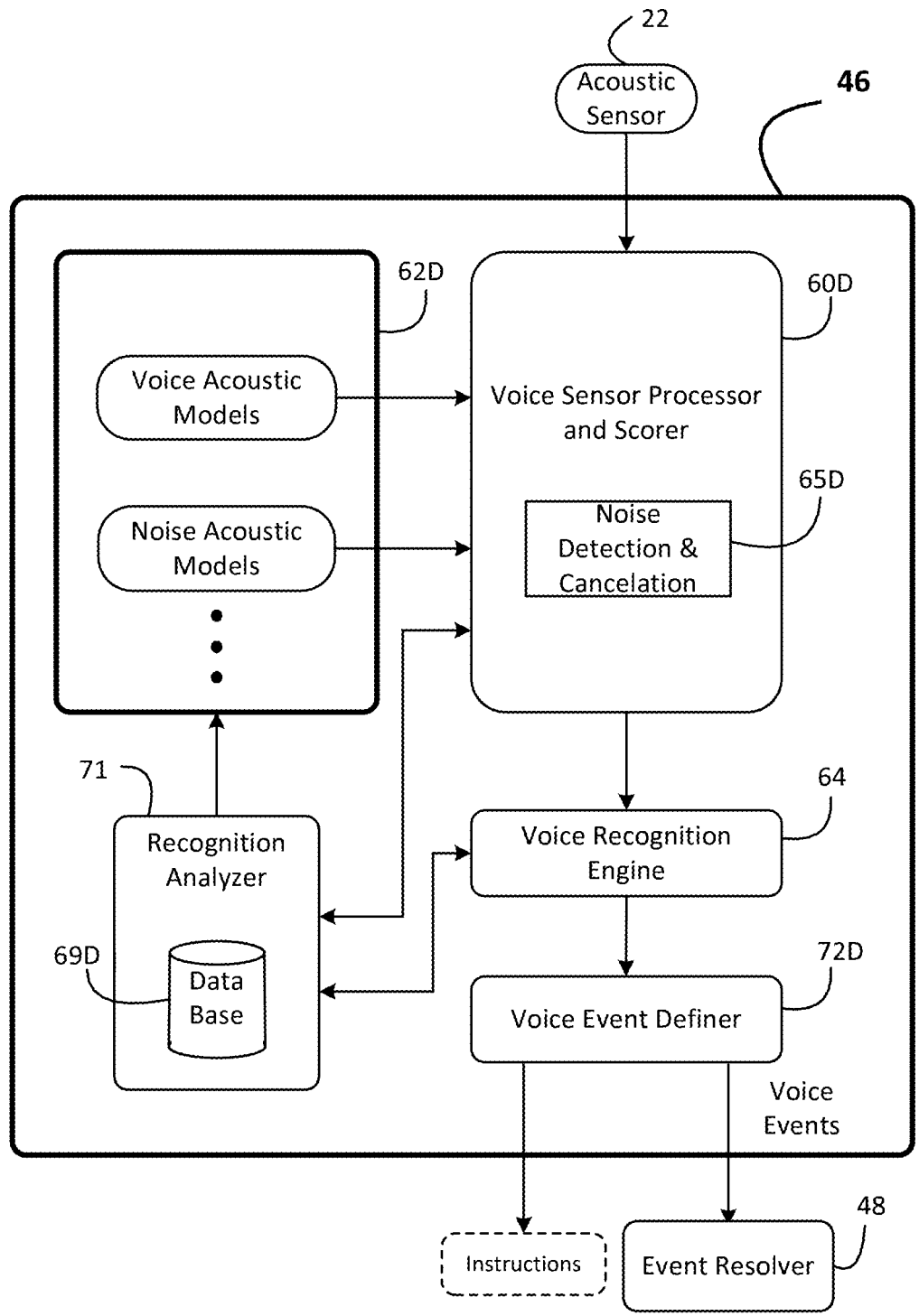

In accordance with a preferred embodiment of the present invention and as shown in FIGS. 2A, 2B and 2C, to which reference is now made, presence resolver 42, alarm resolver 40 and climate resolver 44 may comprise a sensor processor and scorer 60, a models module 62, a multifunctional processor 70, a resolver analyzer 68, a database 69 and an event definer 72. As shown in FIG. 2D, to which reference is also made, voice resolver 46 may comprise a voice sensor processor and scorer 60D, a recognition analyzer 71, acoustics models module 62D, a voice recognition engine 64 and a voice event definer 72D.

Each sensor processor and scorer 60 may be implemented using decision methods, such as fuzzy logic, fuzzy sets and neural network methods. For example, fuzzy logic and fuzzy sets deal with reasoning that is approximate rather than exact. Fuzzy logic and fuzzy sets use the concept of partial truth, in which an object or a variable is not necessarily either true or false (i.e. an object or variable may be true, but only to some degree). The implementation may be viewed as combining a number of inputs in order to make a decision, by utilizing possibility or probability scores rather than hard thresholds to determine if a particular state (such as the presence of an intruder) has occurred.

Fuzzy logic, fuzzy sets and their techniques are described in FUZZY SETS AND FUZZY LOGIC Theory and Applications by George J. Klir and Bo Yuan, Prentice Hall P T R (1995).

Each sensor processor and scorer 60 may sample its sensors, process its inputs, compare the processed inputs to the relevant models of its models module 62 and provide a set of scores, one or more per model. Thus, presence resolver 42 may comprise a presence sensor processor and scorer 60A, alarm resolver 40 may comprise an alarm sensor processor and scorer 60B, climate resolver 44 may comprise a climate sensor processor and scorer 60C and voice resolver 46 may comprise voice sensor processor and scorer 60D.

For example, presence resolver 42 (FIG. 2A) may divide the field of view of the movement detector 20 into three sections, corresponding to three levels of heights, and the data from movement detector 20 may be the signal intensity in each of the upper, middle, and lower sections. The model for the presence of a human may be that the intensity in all three sections be "high". A model for pet movement may be that there be a medium level of signal intensity only in the lower section.

It will be appreciated that there may be a variety of detection intensity and scores. Presence sensor processor and scorer 60A may score the output of movement detector 20 against each model.

Similarly, presence resolver 42 may have models for human sounds and pet sounds for the output of acoustic sensor 22. An exemplary model for human sound may utilize the voice activity detection of a voice recognition engine, known in the art. The voice activity detector may produce one type of signal when a human voice is detected and other types of signals when other types of sounds are detected, such as a pet sound or continuous noise such as a HVAC fan.

Presence resolver 42 may comprise an environmental noise detection and cancellation module 65A, such as those known in the art. Module 65A may operate on the output of acoustic sensor 22, to improve the quality and definition of the sounds that may be received. Module 65A may determine and cancel continuous noises from the output of acoustic sensor 22. Such continuous noises may be characterized with constant amplitudes and frequencies (such as a computer fan, etc.).

Presence resolver 42 may include an acoustic and audio analyzer 63A to generate an analysis of the spectrum, pitch and tempo in the acoustic signal. Presence resolver 42 may have a model for music detection which may define a spectral range, and a range of pitches and tempos. Moreover, the model may include a time element, such that the score may degrade after a predefined length of time.

Presence resolver 42 may have models for types of lighting for light sensor 26 (generally whether or not artificial light is on or off), and models for the ranges of $CO_2$ levels (e.g. above 600 ppm), for $CO_2$ sensor 30. Finally, presence resolver 42 may have models of human and pet shapes for image sensor 32.

For image sensor 32, presence sensor processor and scorer 60A may utilize various image processing methods, known in the art, to understand each received image frame. As is known in image compression, elements of the images which don't change (i.e. the fixed items in the room) can easily be determined. Image processing can include the determination of body parts, and of faces. Image processing can additionally include dividing the field of view into sections, such as upper, middle and lower, where movement detection in all sections may indicate human movement, while detection of movement in the lower section may indicate pet movement.

The output of each section may be provided to a different model in presence sensor processor and scorer 60A whose score may indicate the presence or absence of a mammal. It will be appreciated that movement detection based on image sensor 32 may be more accurate in the presence of light than movement detection based on movement sensor 20. However, movement detection based on movement sensor 20, which utilizes IR (heat), has advantages when the room is dark.

The set of parameters may then be provided to be compared to each of the models that presence sensor processor and scorer 60A may have which indicate the presence of a mammal in the room.

Presence resolver 42 may score the output of each of its models and may provide them to its multifunctional processor 70A, described in more detail herein below.

Alarm resolver 40 (FIG. 2B) may have a different set of models for the output of each of movement detector 20, acoustic sensor 22, light sensor 26, $CO_2$ sensor 30 and image sensor 32. Since alarm resolver 40 may look for indications of intrusion, its models module 62B may comprise a model of unusual noise for the output of acoustic sensor 22. The model may define an unusual noise as a signal of a very short time duration with a high amplitude for certain frequencies. The model may define a glass breaking sound as a signal having a very short time duration (about one second) with an amplitude more than 20 dB above environment noise and having a combination of several high frequencies (e.g. frequencies over 1 KHz). If desired, the output of acoustic sensor 22 may be processed by environmental noise detection and cancellation module 65B when being processed by sensor processor and scorer 60B to find the unusual noise. Alarm resolver 40 may additionally have a model of the turning on of light sensor 26 which may indicate the movement of an intruder into the room.

Climate resolver 44 (FIG. 2C) may have a models module 62C which may comprise a model for the output of thermometer 24 as a range of temperatures that a person may find comfortable or a range of temperatures around a desired temperature that the user of the room may have set. Climate sensor models module 62C may have a model for humidity sensor 28 as a desired range of humidity, and a model for $CO_2$ sensor 30 as a desired range of $CO_2$, for example less than 700-800 ppm, which may make a room comfortable to a human. The $CO_2$ model for climate will typically be different than the $CO_2$ model for indicating the presence of a human.

Voice resolver 46 (FIG. 2D) may have a voice sensor processor and scorer 60D which may have a model for human voice, similar to that of presence resolver 42. Voice resolver 46 may also have models for different types of background 'noise', such as radio, music, noise from electrical equipment, etc. Similar to the other sound processors, voice sensor processor and scorer 60D may include an environmental noise detection and cancellation module 65D to improve the quality and definition of the sounds prior to their scoring, such as by removing a detected noise signal.

When scorer 60D generates a score which indicates voice, scorer 60D may provide the improved acoustic signal to a voice recognition engine 64 which may recognize voice commands to change the state of the relevant appliances and electrical devices 52, alarm system 50, entertainment systems 54, HVAC elements 56 etc.

It will be appreciated that, while the various resolvers 40-46 may receive input from the same sensors, they each compare the data to different models, based on the type of information they need in order to determine if their type of event has happened and, of course, to respond accordingly. For example, the acoustic model for alarm resolver 40 is significantly different than the acoustic model for presence resolver 42 and the $CO_2$ model for presence resolver 42 may be significantly different than the $CO_2$ model for climate resolver 44. This enables the present invention to utilize the same sensors for multiple purposes.

The processor and scorers 60 may operate to define each sensor output as a vector. Some sensor outputs may be one-dimensional, such as the output of light sensor 26 or thermometer 24, while others may be N-dimensional, such as the output of acoustic sensor 22, movement sensor 20 or image sensor 32.

Similarly, each model may be defined as an N-dimensional vector, and processor and scorers 60 may determine the distance between the sensor output vector and the model vector. The distance may be utilized as the score for that model, where a close distance may provide a high score while a far distance may provide a low score. One such distance calculation may be:

$$D = \Sigma_{i=1}^{N} |Mi - Si| \qquad \text{Equation 1}$$

Where D is the overall calculated distance and $|Mi-Si|$ is the distance for the ith vector element.

Multifunctional processors 70A, 70B and 70C respectively, may combine information (as scores) from different disciplines into a decision process, producing an overall score. Since the information comes from different disciplines, the scores are normalized to enable the combination.

Each processor 70 may combine multiple scores and statuses, weighted either by default weights or learned weights, generally according to their importance to the operation of the resolver, to generate an overall score P(P), which may be a weighted sum of the multiple scores.

The weights define how the various types of models combine together to indicate the goal of each resolver. For example, for presence resolver 42, there may be more weight given to the image score (as a function of the current light conditions) than to any of the other scores or all scores may be weighted evenly. Alarm resolver 40 may have different weights for the scores of acoustic sensor 22 and light sensor 26 than presence resolver 42. Moreover, alarm resolver 40 may also include a status indicating that alarm system 50 is armed. This status may be used with a corresponding weight or may operate a different set of weights if the alarm was armed or not. Similarly, climate resolver 44 may receive a status indicating that HVAC element 56 has been activated and may include an additional status for the output of presence resolver 42, so as to include in its calculations the fact that there is or isn't a person in the room.

Multifunctional processors 70 may determine the overall score, such as in the following equation:

$$P(P) = \Sigma_{i=1}^{N} Wpi \ast P(pi) \qquad \text{Equation 2}$$

Where P(pi) is the ith score or status from another resolver or a piece of equipment and Wpi is the weight for the ith score or status.

Each event definer 72 may have one or more instructions for each value of its P(P). For example, presence event definer 72A may instruct an automatic light to turn on if its value of P(P) is above a certain threshold, indicating the presence of a human in the room and that there isn't enough light in the room. Alarm event definer 72B may determine that an alarm situation has been detected for a given value of overall score P(P) and may activate alarm system 50 at that point.

Climate event definer 72C may turn on an air conditioning appliance if its overall score is above a certain value of P(P) and may instruct the relevant HVAC element 56 to work at a lower temperature if there is high humidity in the room. Furthermore, certain values of P(P) may be associated with applying ventilation due to a high level of $CO_2$. Other values of P(P) may turn on a condensing appliance, add ventilation if humidity increases, etc. Furthermore, certain values of P(P) may indicate no presence in the room. When these are received, event definer 72C may indicate to HVAC elements 56 to change to "economic operation" or to shut down. By this operation, unit 10 may reduce energy consumption of HVAC elements 56 while maintaining the comfort of the user.

Thus, each resolver may have different instructions based on a range of values of its overall score P(P).

It will be appreciated that the weights Wp, may be initialized with default values and may be adaptive as the unit is utilized. Default values may be fixed or may vary according to specific hardware configurations. For example, there may be multiple types of movement detector 20, each with a different size lens. In this example, the initial weighting may be different depending on the structure and size of the lens.

Resolver analyzers 68 may adapt the weights for their respective resolver. To do so, each sensor processor and scorer 60 may store the sensor data, model parameters and score results in their associated database 69. If desired, each sensor processor and scorer 60 may review the data and store it when there is a predefined change in the sensor data (i.e. the immediate change is large enough or there is a significant change over a predetermined period of time). In addition, resolver analyzers 68 may store the weights Wpi and the overall scores P(P) from the multifunctional processors 70. All parameters and recorded data may have an associated time stamp. The resolver may also save all data and parameters periodically.

Resolver analyzers 68 may perform various statistical analyses on the data in databases 69, and may search for changes in the sensor outputs and in the scores, for example to determine its relevancy and effectiveness. For example, resolver analyzers 68 may determine a variance value Vpi for each type of data and may update the weight associated with the data by the variance. Specifically, all Wpi may be updated by:

$$Wpi = Wpi_0 \ast Vpi \qquad \text{Equation 3}$$

Where Wpi is the updated weight, $Wpi_0$ is the previous value of the weight and Vpi is the variance normalized to the range 0 to 1, where 0 indicates no change and 1 indicates the maximal possible change in the associated signal.

Resolver analyzers 68 may then normalize their set of weights, for example, by requiring that the sum of the weights be 1:

$$\Sigma_{i=1}^{N} Wpi = 1 \qquad \text{Equation 4}$$

For example, as described hereinabove, the field of view of image and movement sensors 32 and 20, respectively, was divided into 3 sections. In one room, for example, the lower section may be blocked by permanent furniture, so its output will be constant for a period of time.

For this embodiment, the output of each section may be stored in the database 69 and each section may have its own weight in the overall score for the resolver.

In this example, the data over a period of time, for example several days, may show that lower section value may be constant while other sections may have changes in their values. When resolver analyzer 68 may identify this situation (for example, by noticing that there was no change recorded for the lower sensor section), analyzer 68 may reduce or eliminate the influence of the lower sensor section by reducing the weight Wpi associated with the relevant section. At the same time, analyzer 68 may increase the weights associated with the other two sections (i.e. the middle and high field of view sections of the sensor), or may change all of the weights Wpi that appears at the related equation.

For other types of data, other types of changes may be important. For example, for $CO_2$, a continuous change of 5 ppm per hour that may happen over several hours will be considered and recorded as an important change.

Recognition analyzer 71 may store the parameters of the voice acoustic model and the noise acoustic models 62D and any parameters utilized by voice recognition engine 64 in database 69D. It may also save the resultant instructions. For example, recognition analyzer 71 may store the instructions produced by voice recognition engine 64 when the user may provide a correction to the instructions, such as when recognition engine 64 misunderstood the user's speech. When this happens, recognition analyzer 71 may request that the user retrain engine 64 and recognition analyzer 71 may store the retrained signal in database 69.

Recognition analyzer 71 may also analyze the quality of the recognition, as a function of the scores of the various background 'noises'. The scores determine what type of background noises there may currently be in the room. With this information, recognition analyzer 71 may determine for which type of noise(s), noise detection and cancellation module 65D should be activated or deactivated. The process may require a few iterations where in each iteration, recognition analyzer 71 may activate the cancellation of one or more noise type(s) and may determine its effect on the quality of the recognition of voice recognition engine 64.

As mentioned hereinabove, each event definer 72 may provide its event information, defined by type and time of occurrence as well as other parameters, to event resolver 48. In turn, event resolver 48 may analyze the events and may update the activations and/or the schedules of activation. Exemplary events may be a change in the temperature setting of an air conditioner, a change in state of a piece of equipment, an alarm event or an activation of the alarm, a change in the level of $CO_2$, etc.

There may be multiple types of events. For example, there may be a user created event which may happen when the user changes the state of equipment 50-56 through user input module 49. This is an event which may be provided directly to event resolver 48.

A second type of event may be a resolver instruction defined by when one of resolvers 40-46 may provide instructions to change the state of its associated device(s).

A third type of event may be a resolver event defined by when the output of one of scorers 60 may be above a predefined level for one of its associated sensors, even if this doesn't cause the event definer 72 and the corresponding resolver to change the state of its associated equipment.

It will be appreciated that the resolver events may be particularly reliable since resolver events only occur if the preponderance of measurements measured by a resolver indicates that an event has occurred. Recall that most of the resolvers have more than one sensor and that the models of the sensor data for each resolver are defined to match the purpose of each resolver. Thus, a resolver event on the one hand is unlikely to provide a false activation and on the other hand will have a very high level of detection.

Each event definer 72 may generate instructions to equipment 50-56 and events, both of which are provided to event resolver 48.

Figure 3:
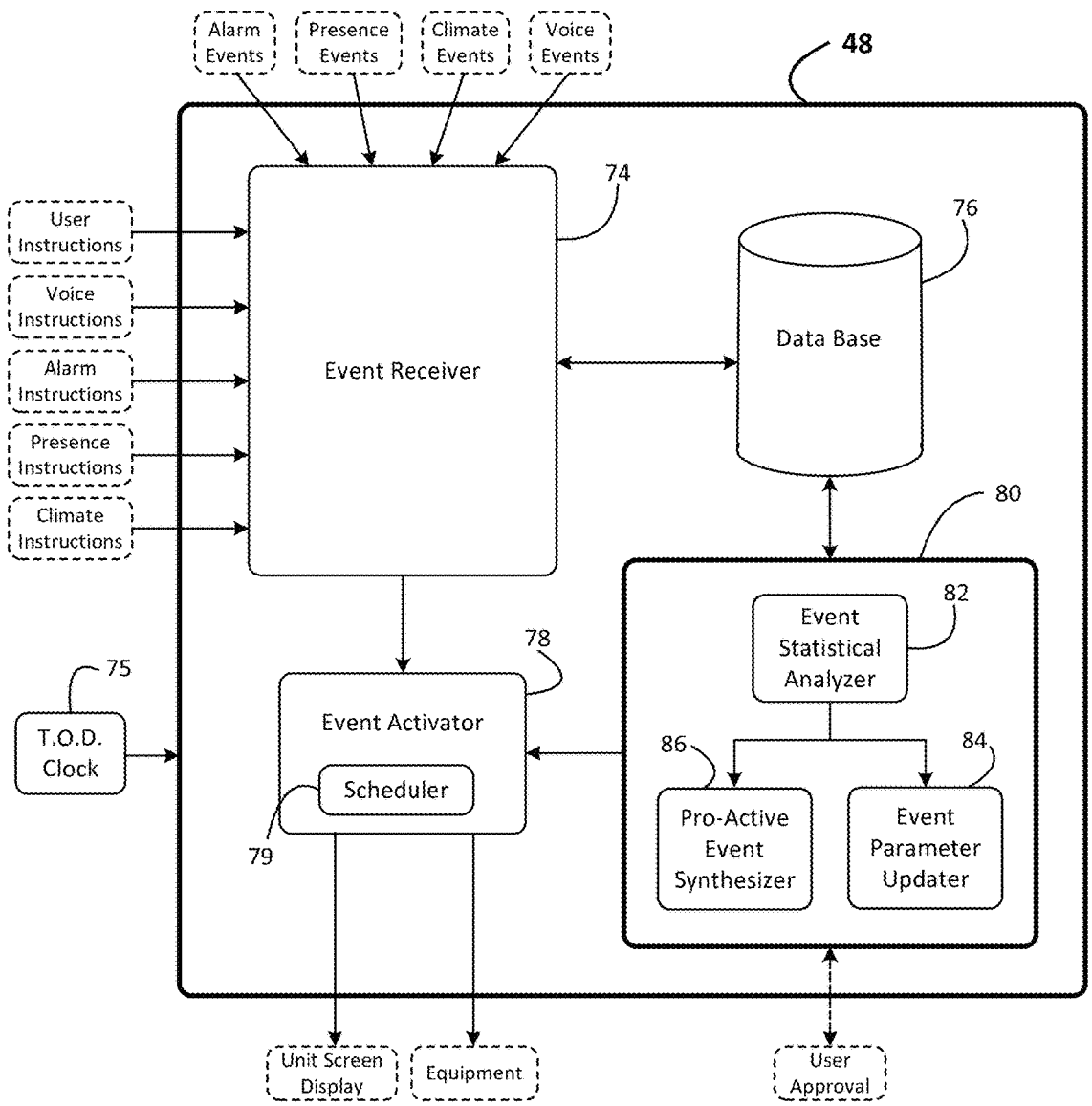
FIG. 3 is a schematic illustration of an event resolver forming part of the automation unit of FIG. 1.

As shown in FIG. 3, to which reference is now made, event resolver 48 may comprise an event receiver 74, a database 76, an event activator 78 and a self-learning module 80.

Event receiver 74 may receive input from the user, either to change the current state of a piece of equipment, or to provide a schedule of operations for the equipment in the room. In addition, event receiver 74 may receive events from resolvers 40-46, as they operate and generate events. Event receiver 74 may store all of the events in database 76, and may list, as described hereinbelow, the type of event, the time of the event and any relevant parameters of the event. Event database 76 may also store data that relates to events, instructions and scenarios, as described hereinbelow. A scenario may be a change of state (such as turning it on or off, raising or lowering it, changing its set point, etc.) of a piece of equipment with a specific schedule or changing the states of multiple pieces of equipment (with or without schedule).

Event receiver 74 may provide all immediate events and/or scenarios to activator 78 to change the state of one or more pieces of equipment. Event activator 78 may comprise a scheduler 79 which may utilize clock module 75. Scheduler 79 may receive a schedule of events and may instruct activator 78 to activate the relevant equipment according to the schedule and the time of day produced by clock module 75.

Some of the functionality within event receiver 74 and event activator 78 may be included in each resolver, operating resolver corresponding data and record it in the database.

Self-learning module 80 may comprise an event statistical analyzer 82, an event parameter updater 84 and a pro-active event synthesizer 86, and may adapt the operation of room automation unit 10 as the user uses the room. Using the data of database 76, analyzer 82 may analyze the statistics of the different types of events, using standard statistical tools. For example, analyzer 82 may cluster events, may use a sliding window technique, may determine any frequencies of occurrence, may generate histograms of the events to discover patterns, and may determine a mean and standard deviation for the occurrence of the event, typically on the timing of the event. Clustering may provide a range of times that events happened while tools as the mean and standard deviation may provide an event parameter update suggestion, based on the statistics, of a change to the timing of an event as part of the cognitive cycle.

Event parameter updater 84 and pro-active event synthesizer 86 may update database 76 with updated or new activations/changes of state and scenarios for activated equipment and if required, associated schedules. Event parameter updater 84 may suggest parameters updates such as schedule updates. Pro-active event synthesizer 86 may provide suggestions to activate equipment. These suggestions may operate with or without approval by the user. Where new equipment activations and/or changes in schedule are determined, pro-active event synthesizer 86 or event parameter updater 84 may update database 76 with the new schedules or the new changes of state and may update the event activator 78 and/or update scheduler 79 accordingly.

In addition, event parameter updater 84 may schedule multiple pieces of equipment within a scenario. For example, the following scenario may happen: light A off, light B off, and close blind A. Alternatively, a scenario may happen over a period of time, such as open light A and blind A by 8:00 followed by activate the HVAC by 8:18. Other scenarios may occur over a longer period of time, such as a 24 hour cycle or more.

Since resolver events may be very reliable due to the multiple sensor inputs and the operations of the resolvers 40-46, event statistical analyzer 82 may weight resolver events more highly than sensor events and may weight user events higher than resolver events. Given the general reliability of the events, the suggestions generated by updater 84 may be well matched to the operation of the room.

Figure 4:
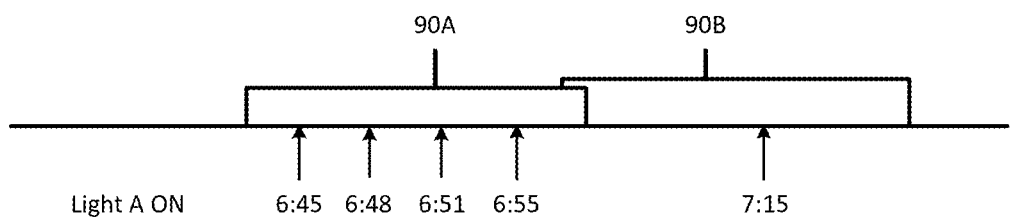
FIG. 4 is a timing diagram, useful in understanding the operation of the event resolver of FIG. 3.

Reference is now made to FIG. 4, which may show exemplary data for a light A being turned on and off over a week. As can be seen, during several days/weeks, analyzing the specific intervals in the same timeframe for several days, light A was turned on at 6:45, 6:48, 6:51, 6:55 and 7:15, some of them multiple times.

FIG. 4 shows a sliding window for specific time intervals, such as 20 minute periods 90. The 20 minute period labeled 90A, from 6:45 to 7:05, has 4 events, some of which may have occurred multiple times, while the 20 minute period labeled 90B has only 1 event. Event statistical analyzer 82 may analyze the event data and may produce, for example, a mean and standard deviation of the activation time for all 20 minute periods with X or more events, where X may be 4.

Given the data from event statistical analyzer 82, pro-active event synthesizer 86 may suggest a new activation of light A. In such a suggestion, the mean value of the activation time for the 20 minute period may be the suggested time to automatically turn on light A. This suggestion may be for specific day(s) or other periods. Optionally, by user approval, statistical analyzer 82 may add the event of turning on light A on specific time and days to the data base 76 as a new event. Analyzer 82 may also add the equipment operation and time to the event activator 78 and scheduler 79.

Analyzer 82 may analyze each piece of equipment separately and may analyze their data over periods of any appropriate length, which may be preset as desired. Moreover, database 76 may not be infinite. Therefore, data on daily events may be stored in the data base for a given period of time, such as three months, and data on weekly events may be stored for different period of time, such as one year period.

It will be appreciated that event statistical analyzer 82 may analyze the recorded data in order to find patterns of activities that may be the basis to form a new scenario, which may involve one or more different pieces of equipment.

Once a new event or a new scenario is established, event statistical analyzer 82 may analyze further user activations regarding the event or the scenario and may update the operation accordingly.

Figure 5A:
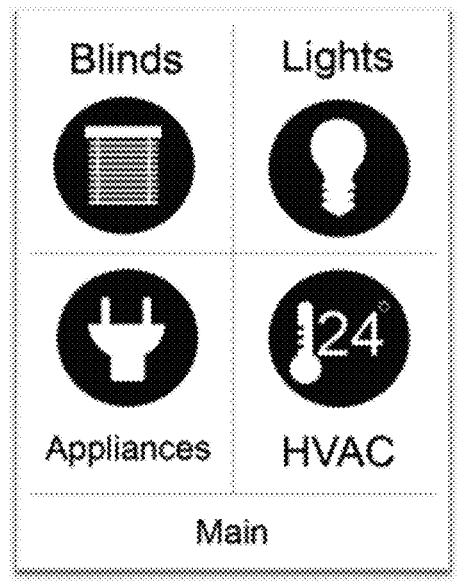
FIGS. 5A, 5B, 5C and 5D are illustrations of a default screen of the automation unit of FIG. 1.
Figure 5B:
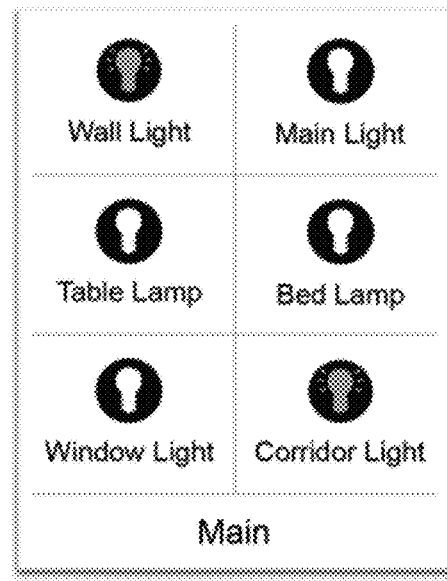
Figure 5C:
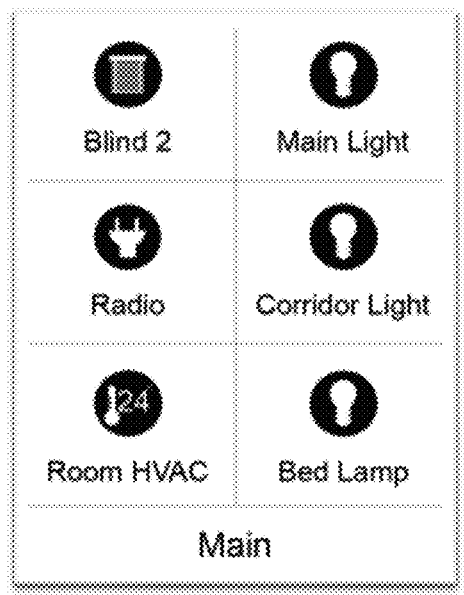

Reference is now made to FIGS. 5A, 5B, 5C and 5D, which illustrate multiple versions of screen of touch screen display unit 10. FIG. 5A illustrates a default screen which may initially provide "buttons" for all the different types of pieces of equipment that are operated by the unit. The example in FIG. 5A is of a unit that controls 4 types of equipment: lights, blinds, appliances and HVAC. If the user would like to turn on a specific light, s/he needs to push/slide the "Lights button" that will direct him/her to the Light screen of FIG. 5B, where the required lamp/light will be activated. Over the time, event database 76 will record all changes of state of the different pieces of equipment. Event analyzer 82 may review the data and pro-active event synthesizer 86 may take a pro-active step and suggest a new default screen, such as the display of FIG. 5C that has a user's most frequently used equipment, such as a combination of specific lights and specific blinds. It will be appreciated that this may reduce the number of button pushes/slides the user may have to do which may increase the convenience of unit 10. The analysis will be based on similar statistical methods as described hereinabove, to compare the largest number of changes of state of each piece of equipment within a pre-defined time frame, such as within a week.

Figure 5D:
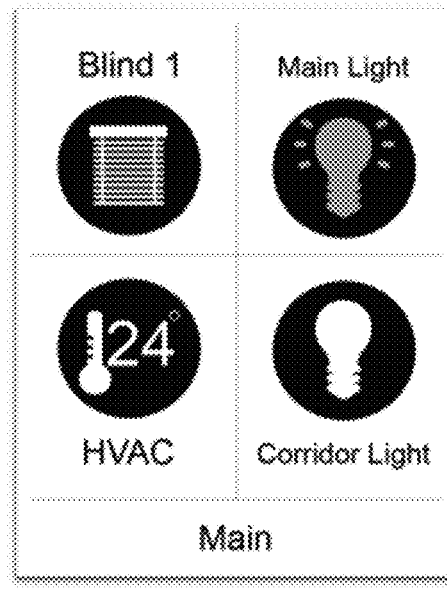

In an alternative embodiment, event analyzer 82 may further adapt the display for short-sighted people or for older people where it may provide only 4 devices but using larger icons, as shown in the display of FIG. 5D. As the database is updated, the suggested devices may change over time.

Figure 6:
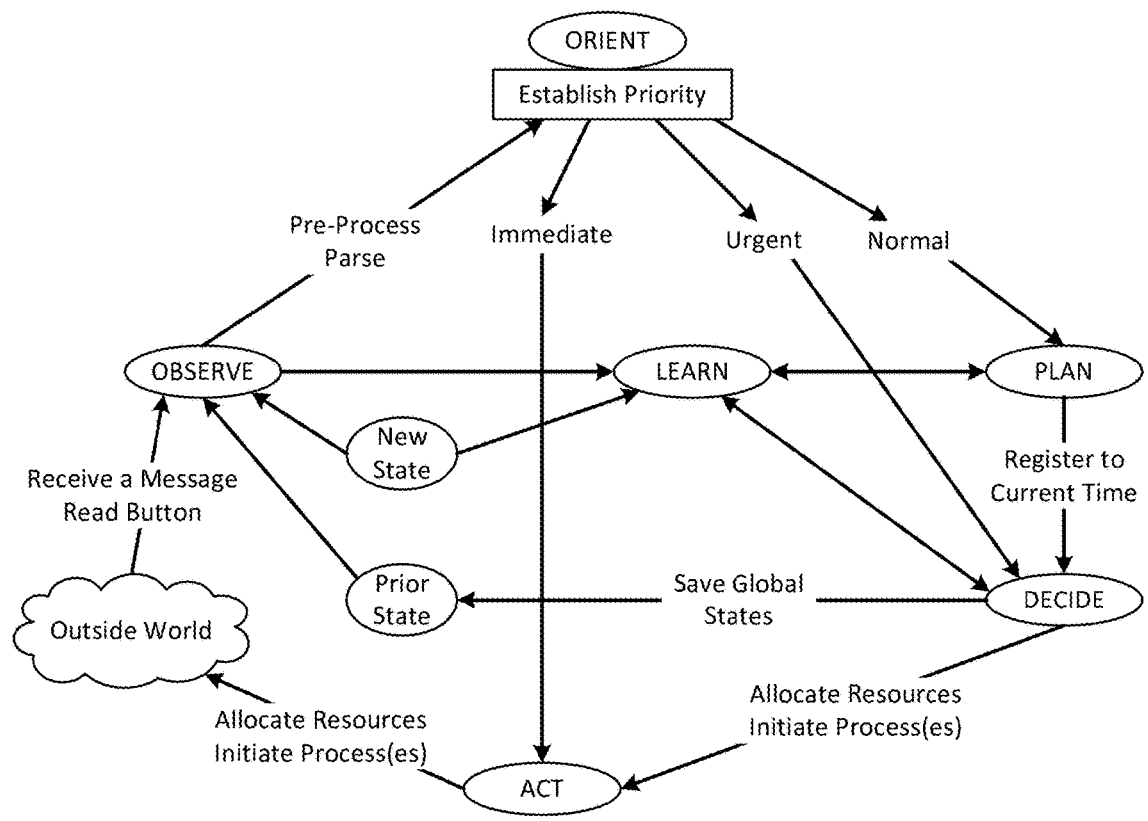
FIG. 6 is a state diagram of a cognitive process implemented by the automation unit of FIG. 1.

It will be appreciated that the present invention may be a cognitive automation unit and may follow a cognitive cycle, as shown in FIG. 6 to which reference is now briefly made. Unit 10 may include elements which observe (sensors 20-32) both in the room and externally, elements which provide input from the user (from user input module 49, from the main display and other user input devices), elements which learn, plan and decide (self-learning module 80 and database 76 in event resolver 48) and elements which act (event activator 78 and scheduler 79). Moreover, event resolver 48 may be an orienting element which may determine the priority of the response, among normal, immediate and urgent responses. Event resolver 48 may also allocate resources among the equipment 50-56 which may be connected to it and may initiate multiple equipment changes of state and schedules which may affect the room and its functioning. Moreover, the cognitive cycle may also be implemented in resolvers 40-46, which may include elements which observe (sensors 20-32) both in the room and externally, elements which learn, plan and decide on the changes (resolver analyzer 68 and/or recognition analyzer 71), elements which are updated (at least the processor and scorers 60 and multifunctional processor 70), and elements that act (event definers 72).

It will be appreciated that the present invention is a proactive automation unit capable of suggesting new changes of state of pieces of equipment or new scenarios, all with or without schedules.

It will be appreciated that unit 10 may be an energy controller, able to reduce energy consumption, particularly via climate resolver 44. Climate resolver 44 may receive climate information (for example, via thermometer 24, humidity sensor 28 and $CO_2$ sensor 30 and external sensors) and may compare the received information from the desired climate provided by the user. Climate resolver 44 may determine changes in the climate, such as may occur when a window or blind is opened, and may generate instructions accordingly, such as to suggest that the window or blind be closed, or that the HVAC system stop operating, in order to achieve the desired climate and save energy. In this way, unit 10 may be able to achieve a desired climate with a minimum of energy expended. Furthermore, the indications from presence resolver 42 with respect to the lack of a human in the room may be generally reliable and thus, when climate resolver 44 may instruct the HVAC system to operate in economy mode or to shut it down, these instructions are unlikely to be countered by a human in the room. This holds true for other instructions as well event resolver 48 may shut down lights or other unnecessary equipment when no presence is indicated, thereby further reducing energy consumption.

Figure 7:
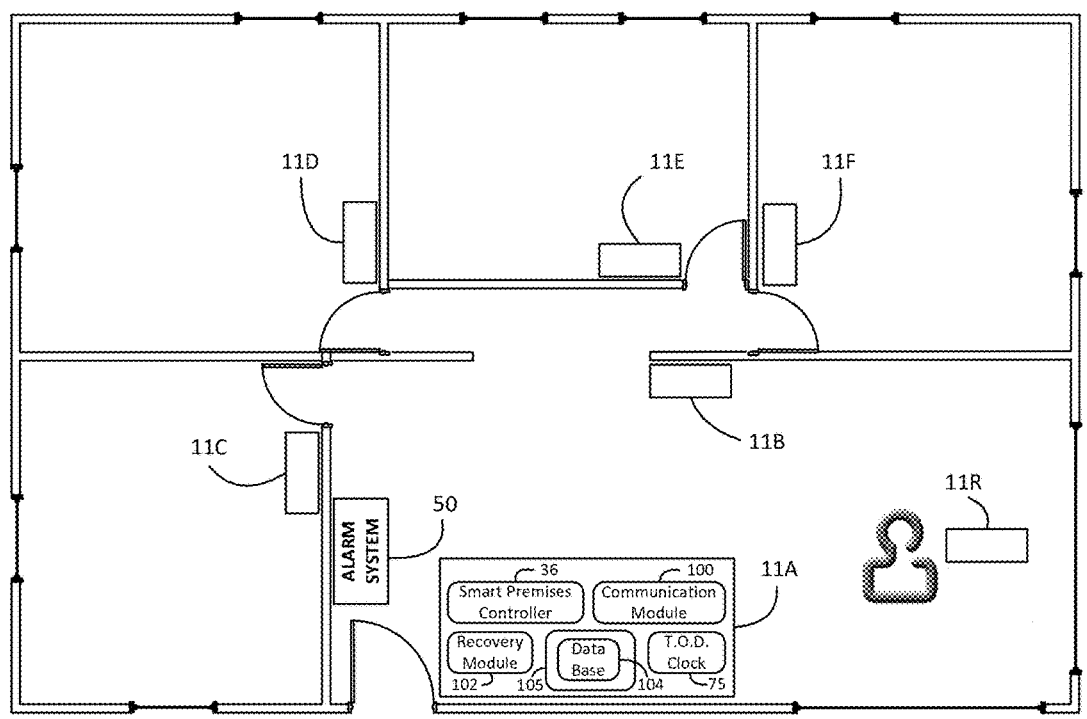
FIG. 7 is a schematic illustration of a premises with multiple automation units therein.

Reference is now made to FIG. 7, which illustrates a building, such as a home or an office, having multiple automation units 11, where automation units 11 may be similar to automation units 10. For example there may be one automation unit 11 per room, where a room may be any room in a building, such as a bedroom, kitchen, living room, dining room, public area, conference room, etc. In addition, there may be a remote or mobile unit 11R. Each automation unit 11 may have a controller, such as smart premises controller 36 or any other appropriate controller to control pieces of equipment, a communication module 100 which may operate with a wired and/or wireless communication network, such as X-10, Wi-Fi, ZigBee, Z-Wave, proprietary protocol etc., with which it may communicate with the other automation units 11 in the building, with pieces of equipment, and/or with any external sensors. As shown in FIG. 7, each automation unit 11 may have a clock module 75, a recovery module 102 and a global database 105, storing at least a local database 104 for its unit 11. The local database 104 may store all databases 69 and 76.

Figure 8:
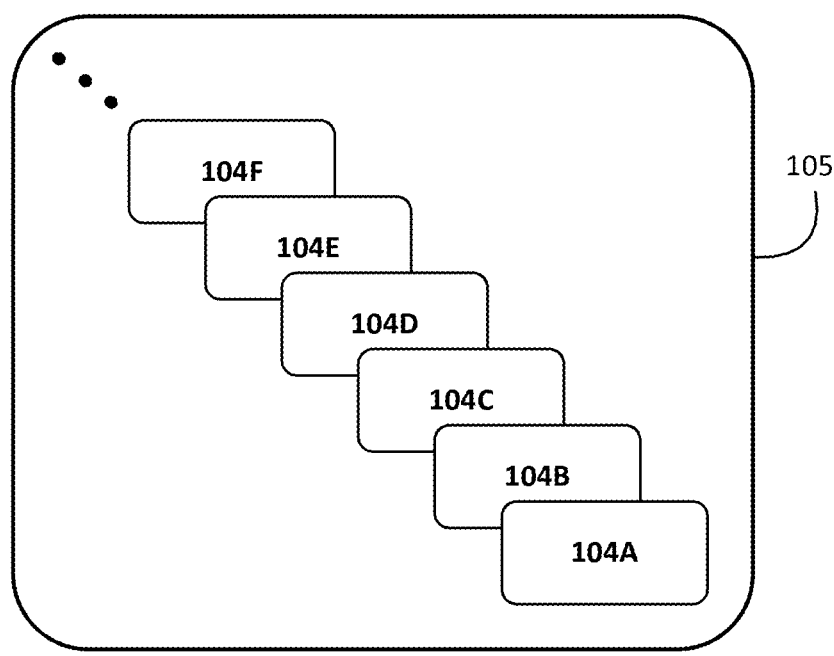
FIG. 8 is an illustration of a database forming part of the automation unit of FIG. 1.

In accordance with a preferred embodiment of the present invention and as shown in FIG. 8 to which reference is now briefly made, automation units 11 may share their databases 104 with each other, such that each automation unit 11 may have a copy of the databases 104 of all the other units in the building sharing the network. This redundancy may enable any automation unit 11 to take over when another unit 11 fails to operate for some reason.

Recovery modules 102 may use different methods to implement this redundancy. For example, they may have a lookup table indicating which unit 11 is to take over for which non-functional unit.

Each automation unit 11 may periodically provide a 'Keep alive and Status' signal to the recovery modules of the other units 11, which may provide an indication that it is alive and may provide a functionality status for one or more of its modules. For example, one status may be the status of the touch screen. If it ceases to function, the recovery module 102 of the assigned unit may "activate" its copy of the database 104 of the non-functional unit, such that the user may use the touch screen of the assigned unit. If only the touch screen isn't functional, then the assigned unit may receive sensor data from the poorly functioning unit and may determine the events in the room.

If, on the other hand, a unit does not generate its 'Keep alive and status' signal at all, then the assigned unit may take control over the actuation of equipment and scenarios but without any sensor data from the non-functional unit to resolve.

It will be appreciated that each unit 11 may control its own room and any equipment in the building. Together, the set of automation units 11 throughout the building form a distributed control system, each controller is capable of operating by itself and there is no requirement for a central controller that will control or/and coordinate all units and activities. It will be appreciated that each unit 11 may manage and/or determine schedules of changes of state with the support of its own clock module 75. With communication modules 100, shared databases 104 and recovery modules 102, the set of automation units 11 throughout the building also have redundancy and thus can recover from failures of any unit 11.

In a further embodiment of the present invention, units 10 or 11 may utilize external sensors, such as a thermometer in a corridor between rooms and/or a rain detector outside of the house. The external sensors may comprise communication modules to transmit their sensor data and each resolver in each room unit 10 or 11 may have the appropriate sensor models for this data.

Similarly, units 10 or 11 may also control external appliances, where appropriate, even when there is no failure of a unit. For example, a user may instruct its unit 10 or 11 to turn on a coffee machine in the kitchen when the user begins to move around in his bedroom in the morning.

It will be appreciated that the present invention may provide an automation system for a premises which may be robust yet simple to use. The system may be a distributed automation system for a premises with cognitive abilities as well as pro-active abilities. Thus, the unit may learn from its operation and its environment and may generate or provide suggestions for improvements or for new changes of state or scenarios.

Unless specifically stated otherwise, as apparent from the preceding discussions, it is appreciated that, throughout the specification, discussions utilizing terms such as "processing", "computing", "calculating", "determining", "resolving" or the like, refer to the action and/or processes of a computer, computing system, micro-controller, processor, digital signal processor, FPGA or similar electronic computing device that manipulates and/or transforms data represented as physical, such as electronic, quantities within the computing system's registers and/or memories into other data similarly represented as physical quantities within the computing system's memories, registers or other such information storage, transmission or display devices.

Embodiments of the present invention may include apparatus for performing the operations herein. This apparatus may be specially constructed for the desired purposes, or it may comprise a general-purpose computer, processor, micro-controller selectively activated or reconfigured by a computer program stored in the computer. Such a computer program may be stored in a computer readable storage medium, such as, but not limited to, any type of storage device, including floppy disks, optical disks, magnetic-optical disks, read-only memories (ROMs), compact disc read-only memories (CD-ROMs), random access memories (RAMs), electrically programmable read-only memories (EPROMs), electrically erasable and programmable read only memories (EEPROMs), magnetic or optical cards, Flash memory, disk on key, or any other type of media suitable for storing electronic instructions and capable of being coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the desired method. The desired structure for a variety of these systems will appear from the description above. In addition, embodiments of the present invention are not described with reference to any particular programming language. It will be appreciated that a variety of programming languages and operating systems may be used to implement the teachings of the invention as described herein.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A first automation unit and at least one second automation unit for controlling and/or monitoring two or more pieces of equipment in a premises, to form, when implemented in said premises, a distributed control system, the first automation unit comprising:
   a first, local database to store at least data from sensors and controlled equipment controlled by said first unit and at least events determined by said first unit;
   at least one second database to store at least data from sensors and controlled equipment controlled by said at least one second unit and events determined by controller of said at least one second unit;
   a controller, forming part of said distributed system to analyze data in said first local database for activating equipment and to use data in said at least one second database for activating controlled equipment controlled by said at least one second unit; and
   a communication module to communicate at least said first local database with said at least one second unit;
and said at least one second automation unit comprising:
   a third, local database to store at least data from sensors and controlled equipment controlled by said second unit and at least events determined by said second unit;
   at least one fourth database to store at least data from sensors and controlled equipment controlled at least by said first unit and events determined at least by said controller of said first unit;
   a controller, forming part of said distributed system to analyze data in said third local database for activating equipment and to use data in said at least one fourth database for activating controlled equipment controlled by at least said first unit; and
   a communication module to communicate at least said third local database with at least said first unit, to update its said second unit database.

2. The unit according to claim 1 and also comprising a recovery unit to take over the operation of a non-functioning portion of one of said units using data in said shared database associated with said non-functioning portion.

3. An automation unit for controlling and/or monitoring pieces of equipment in a room, the unit comprising:
   a touch screen display having an initial set of pre-determined screens providing access to said pieces of equipment, said touch screen to display one of said initial screens;
   a database to store at least events for said pieces of equipment with at least an indication of whether or not the event was a user-generated event;
   an event statistical analyzer to analyze said user-generated events for each of the controlled pieces of equipment within a pre-defined time-frame; and
   a proactive unit to review said analysis, to determine the most frequently used ones of said pieces of equipment of different categories and to generate a new operational screen, not part of said initial set, for said touch screen, said new screen at least providing direct access to said frequently used ones of said pieces of equipment on said new screen.

4. A cognitive automation unit for processing data received from a plurality of sensors and controlling and/or monitoring one or more pieces of equipment in at least one room in a premises responsive to said processing, the cognitive automation unit comprising:
   at least one resolver activating said pieces of equipment in response to said at least two sensors of different disciplines;
   an event resolver to control said pieces of equipment at least in response to events, wherein said event resolver comprises:
   a data base to store at least recorded events per controlled equipment with at least its time of occurrence and an indication of whether or not the event was a user-generated event, a resolver-generated event from a decision by said at least one resolver or scenario-generated event from a pre-determined scenario defining which piece or pieces of equipment to operate;
   an event statistical analyzer to statistically analyze recorded events of a controlled piece of equipment to find patterns of activation of said equipment within pre-defined time intervals; and
   a cognitive module to analyze said patterns of recorded scenario-generated events for at least one piece of equipment in comparison to user-generated events and resolver-generated events for said at least one piece of equipment and to modify said associated scenario as a result.

5. A proactive automation unit for processing data received from a plurality of sensors and controlling and/or monitoring one or more pieces of equipment in at least one room in a premises responsive to said processing, the proactive automation unit comprising:
   at least one resolver activating said pieces of equipment in response to said at least two sensors of different disciplines; and
   an event resolver to control said pieces of equipment at least in response to events, wherein said event resolver comprises:
   a data base to store at least recorded events per controlled equipment with at least its time of occurrence and an indication of whether or not the event was a user-generated event, a resolver-generated event from a decision by said at least one resolver or scenario-generated event from a pre-determined scenario defining which piece or pieces of equipment to operate;
   an event statistical analyzer to statistically analyze recorded events of a controlled piece of equipment to find patterns of activation of said equipment within pre-defined time intervals;
   a cognitive unit updater to analyze said patterns of said recorded scenario-generated events for at least one piece of equipment in comparison to user-generated events and resolver-generated events for said at least one piece of equipment and to modify said associated scenario as a result; and
   a proactive module to analyze said patterns of said recorded user-generated and said resolver-generated events and to create at least one new scenario for at least one piece of equipment based on said analysis.

6. An energy controller for processing data received from a plurality of sensors and controlling and/or monitoring one or more pieces of equipment in at least one room in a premises responsive to said processing, the energy controller comprising:
   a movement sensor for detecting movement in the at least one room;
   an acoustic sensor for sensing sound in the at least one room;
   a light sensor for sensing a level of illumination in the at least one room;
   a $CO_2$ sensor for sensing a $CO_2$ level in the at least one room;
   an image sensor for imaging the at least one room;

a presence resolver to determine the presence of a human in said room using sensor data from said movement, acoustic, light, CO2 and image sensors;

a thermometer for sensing an ambient temperature in the at least one room;

a humidity sensor for sensing a humidity level in the at least one room;

a climate resolver, receiving sensor data from said temperature, humidity and CO2 sensors, to maintain a climate at least in said room as defined by a user of said room with minimal energy expenditure and in response to output of said presence resolver and the processed output of said temperature, humidity and CO2 sensors; and an event resolver to control pieces of equipment affecting said climate in response to output of said climate and presence resolvers.

7. The energy controller according to claim 6 and wherein at least one resolver comprises a cognitive automation unit to learn from at least its sensor data, to modify parameters of operation of said resolver.

8. The energy controller according to claim 6 and also comprising a proactive module to generate a change of state for said at least one piece of equipment and/or a scenario for said pieces of equipment based on event data from said resolvers.

9. An automation unit for a premises, the automation unit comprising:

a movement sensor for detecting movement in at least one room of said premises and at least one movement model having multiple sectors, wherein said sectors are defined according to height above the floor of said at least one room;

an acoustic sensor for sensing sound in the at least one room, at least one acoustic model of human sounds and at least one acoustic model of pet sounds;

an image sensor for imaging the at least one room at least one image model of a human and at least one image model of a pet; and a presence resolver to receive the output of said sensors and said models to determine if a human or a pet is at least in said room, said presence resolver comprising a multifunctional processor to compare said models to their associated said sensor output and to calculate together weighted versions of said comparisons to determine said presence.

10. An alarm system protecting a predefined space, the alarm system comprising:

an acoustic sensor to sense sound at least in said space and at least one acoustic model of unusual sounds as defined by its duration, amplitude and frequencies;

a movement sensor to detect movement in said space and at least one movement model having multiple sectors, wherein said sectors are defined according to a height above a floor;

an image sensor for imaging at said space, at least one image model of a human and at least one image model of a pet; and an alarm resolver to receive the output of said sensors and said models wherein said alarm resolver comprises a multifunctional processor to compare said models to said their associated sensor output and to calculate together weighted versions of said comparisons to determine if said space has been invalidly entered and to activate an alarm when said determination is positive.

11. A method for a first automation unit and at least one second automation unit for controlling and/or monitoring two or more pieces of equipment in a premises, the method for the first automation unit comprising:

storing in a first, local database at least data from sensors and controlled equipment controlled by said first unit and at least events determined by said first unit;

storing in at least one second database at least data from sensors and controlled equipment controlled by said at least one second unit and events determined by controller of said at least one second unit;

as part of a distributed control system analyzing data in said first local database for activating equipment and using data in said at least one second database for activating controlled equipment controlled by said at least one second unit;

communicating said first local database with said at least one second automation unit;

and said at least one second automation unit comprising:

storing in a third, local database to store at least data from sensors and controlled equipment controlled by said second unit and at least events determined by said second unit;

storing in at least one fourth database to store at least data from sensors and controlled equipment controlled at least by said first unit and events determined at least by said controller of said first unit;

as part of said distributed system, analyzing data in said third local database for activating equipment and using data in said at least one fourth database for activating controlled equipment controlled by at least said first unit; and communicating at least said third local database with at least said first unit, to update its said second unit database.

12. The method according to claim 11 and also comprising taking over the operation of a non-functioning portion of one of said units using data in said shared database associated with said non-functioning portion.

13. A method for controlling and/or monitoring pieces of equipment in a room, the method comprising:

having an initial set of pre-determined screens providing access to said pieces of equipment said touch screen to display one of said initial screens;

receiving input from a user via said touch screen;

storing at least events for said pieces of equipment with at least an indication of whether or not the event was a user-generated event;

analyzing said user-generated events for each of the controlled pieces of equipment within a pre-defined time-frame;

reviewing said analyzing to determine the most frequently used ones of said pieces of equipment of different categories; and generating a new operational screen, not part of said initial set, for said touch screen, said new screen at least providing direct access to said frequently used ones of said pieces of equipment on said new screen.

14. A cognitive method for processing data received from a plurality of sensors and controlling and/or monitoring one or more pieces of equipment in at least one room in a premises responsive to said processing, the method comprising:

at least one resolving activating said pieces of equipment in response to said at least two sensors of different disciplines;

controlling at least one of said pieces of equipment at least in response to events, wherein said controlling comprises:

storing at least recorded events per controlled equipment with at least its time of occurrence and an indication of whether or not the event was a user-generated event, a resolver-generated event from a decision by said at least one resolver or scenario-generated event from a pre-determined scenario defining which piece or pieces of equipment to operate;

statistically analyzing recorded events of a controlled piece of equipment to find patterns of activation of said equipment within pre-defined time intervals; and analyzing said patterns of recorded scenario-generated events for at least one piece of equipment in comparison to user-generated events and resolver-generated events for said at least one piece of equipment and modifying said associated scenario as a result.

15. A proactive method for processing data received from a plurality of sensors and controlling and/or monitoring one or more pieces of equipment in at least one room in a premises responsive to said processing, the proactive method comprising:

resolving the control of said pieces of equipment at least in response to events, wherein said resolving comprises:

storing at least recorded events per controlled equipment with at least its time of occurrence and an indication of whether or not the event was a user-generated event, a resolver-generated event from a decision by said at least one resolver or scenario-generated event from a pre-determined scenario defining which piece or pieces of equipment to operate;

statistically analyzing recorded events of a controlled piece of equipment to find patterns of activation of said equipment within pre-defined time intervals;

analyzing said patterns of recorded scenario-generated events for at least one piece of equipment in comparison to user-generated events and resolver-generated events for said at least one piece of equipment and to modify said associated scenario as a result; and proactively analyzing said patterns of said recorded user-generated and said resolver-generated events to create at least one new scenario for at least one piece of equipment based on said analysis.

16. A method for controlling energy use by processing data received from a plurality of sensors and controlling and/or monitoring one or more pieces of equipment in at least one room in a premises responsive to said processing, the method comprising:

having a movement sensor for detecting movement in the at least one room;

having an acoustic sensor for sensing sound in the at least one room;

having a light sensor for sensing a level of illumination in the at least one room;

having a CO2 sensor for sensing a CO2 level in the at least one room;

having an image sensor for imaging the at least one room;

presence resolving the presence of a human at least in said room using sensor data from said movement, acoustic, light, CO2 and image sensors;

having a thermometer for sensing an ambient temperature in the at least one room;

having a humidity sensor for sensing a humidity level in the at least one room;

resolving said climate, using sensor data from said temperature, humidity and CO2 sensors, as defined by a user with minimal energy expenditure and in response to output of said presence resolving and the processed output of said temperature, humidity and CO2 sensors;

and also comprising resolving events to control pieces of equipment affecting said climate in response to output of said resolving climate and presence.

17. The method according to claim 16 and wherein at least one of said resolving comprises learning from at least its sensor data and modifying parameters of operation.

18. The method according to claim 16 and also comprising proactively generating a new change of state for said at least one piece of equipment and/or a scenario for said pieces of equipment based on event data from said resolving.

19. A method for determining if a human or a pet is in a room, the method comprising:

sensing movement at least in said room and having at least one movement model having multiple sectors, wherein said sectors are defined according to height above the floor of said at least one room;

sensing sound at least in said room and having at least one acoustic model of human sounds and at least one acoustic model of pet sounds;

imaging the at least in said room and having at least one image model of a human and at least one image model of a pet; and determining if said human or pet is at least in said room at least from comparing said models to their associated said sensor output and calculating together weighted versions of said comparisons.

20. A method for protecting a predefined space, the method comprising:

sensing sound at least in said space and having at least one acoustic model of unusual sounds as defined by its duration, amplitude and frequencies;

sensing movement at least in said space and having at least one movement model having multiple sectors, wherein said sectors are defined according to a height above a floor;

imaging the at least said space and having at least one image model of a human and at least one image model of a pet;

determining if said space has been invalidly entered at least from comparing said models to their associated said sensor output and calculating together weighted versions of said comparisons; and when said method is activated, activating an alarm if said determining is positive.

21. A unit according to claim 9 and also comprising a light sensor for sensing illumination in the at least one room and wherein said weighted versions are weighted differently if said illumination indicates that said room is dark.

22. A unit according to claim 10 and also comprising a light sensor for sensing illumination and wherein said weighted versions are weighted according to the output of said light sensor.

23. A unit according to claim 10 and wherein said weighted versions are weighted differently if said alarm system is currently armed versus if said alarm system is currently not armed.

24. A unit according to claim 5 and wherein said predefined time intervals are clusters defined by similar days, weeks and months.

25. The unit according to claim 5, wherein said at least one resolver is one of the following resolvers: an alarm resolver, a presence resolver, a climate resolver and a voice resolver.

26. The unit according to claim 4, wherein said at least one resolver is one of the following resolvers: an alarm resolver, a presence resolver, a climate resolver and a voice resolver.

27. A method according to claim 19 and also comprising sensing illumination in the at least one room and wherein said weighted versions are weighted differently if said illumination indicates that said room is dark.

28. A method according to claim 20 and also comprising sensing and wherein said weighted versions are weighted according to the output of said light sensor.

29. A method according to claim 20 and wherein said weighted versions are weighted differently if said alarm is currently armed versus if said alarm system is currently not armed.

30. A method according to claim 15 and wherein said pre-defined time intervals are clusters defined by similar days, weeks and months.

31. The method according to claim 14, wherein said at least one resolving is one of the following: alarm resolving, presence resolving, climate resolving and voice resolving.

* * * * *